(12) United States Patent
Horii et al.

(10) Patent No.: US 11,331,588 B2
(45) Date of Patent: May 17, 2022

(54) VIRTUAL REALITY HEADSET STANDS

(71) Applicant: Hewlett-Packard Development Company, L.P., Spring, TX (US)

(72) Inventors: Hiroshi Horii, Palo Alto, CA (US); Kevin Smathers, Palo Alto, CA (US); Ian N. Robinson, Palo Alto, CA (US); Alex Thayer, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 106 days.

(21) Appl. No.: 16/611,980

(22) PCT Filed: Jul. 14, 2017

(86) PCT No.: PCT/US2017/042064
§ 371 (c)(1),
(2) Date: Nov. 8, 2019

(87) PCT Pub. No.: WO2019/013808
PCT Pub. Date: Jan. 17, 2019

(65) Prior Publication Data
US 2020/0197822 A1    Jun. 25, 2020

(51) Int. Cl.
*A63F 13/98*    (2014.01)
*G06F 3/01*    (2006.01)
(Continued)

(52) U.S. Cl.
CPC ............ *A63F 13/98* (2014.09); *A63F 13/211* (2014.09); *A63F 13/24* (2014.09); *A63F 13/428* (2014.09);
(Continued)

(58) Field of Classification Search
CPC .. A63F 13/90–98; G06F 1/1632; G06F 3/011; G06F 3/012
See application file for complete search history.

(56) References Cited

U.S. PATENT DOCUMENTS 5,577,981 A * 11/1996 Jarvik ................ A63B 71/0622
                                                         482/4
5,682,171 A * 10/1997 Yokoi .................... G02B 30/34
                                                         345/7

(Continued)

FOREIGN PATENT DOCUMENTS

CN       205340096 U    6/2016
CN       206594627 U    10/2017
(Continued)

OTHER PUBLICATIONS

Nintendo Virtual Boy—Wikipedia, Wikipedia, 2021 (Year: 2021).*
(Continued)

*Primary Examiner* — Patrick F Marinelli
(74) *Attorney, Agent, or Firm* — HP Inc. Patent Department (57) ABSTRACT

An example virtual reality headset stand includes a base, a stem, and a docking station. The stem, which extends from the base, is angled toward the base. The docking station, which is attached to the stem, is angled away from the stem. The docking station is contoured to hold a virtual reality headset. The docking station includes a lip connected to the stem, a body portion connected to the lip, and a clip connected to the body portion.

13 Claims, 11 Drawing Sheets (51) Int. Cl.
*A63F 13/428* (2014.01)
*A63F 13/211* (2014.01)
*A63F 13/24* (2014.01)
*G06F 1/16* (2006.01)

(52) U.S. Cl.
CPC ............ *G06F 1/163* (2013.01); *G06F 1/1632* (2013.01); *G06F 3/011* (2013.01); *G06F 3/012* (2013.01); *A63F 2300/8082* (2013.01)

(56) References Cited

U.S. PATENT DOCUMENTS

| | | | | |
|---|---|---|---|---|
| 5,690,551 | A * | 11/1997 | Taki | G02B 30/35 463/32 |
| 5,864,346 | A * | 1/1999 | Yokoi | A63F 13/493 345/501 |
| 6,919,867 | B2 * | 7/2005 | Sauer | H04N 13/239 345/8 |
| 9,001,511 | B2 * | 4/2015 | Gobeil | G06F 1/1626 361/679.59 |
| 9,378,028 | B2 | 6/2016 | Jacobsen et al. | |
| 10,305,720 | B1 * | 5/2019 | Sherbondy | A63F 13/25 |
| 10,564,432 | B2 * | 2/2020 | Inoue | G02B 27/0176 |
| 10,780,358 | B1 * | 9/2020 | Smith | A63F 13/98 |
| 10,905,949 | B1 * | 2/2021 | Fuchs | A63F 13/837 |
| 10,946,272 | B2 * | 3/2021 | Fuchs | A63F 13/92 |
| 2007/0053680 | A1 * | 3/2007 | Fromm | F16M 11/18 396/420 |
| 2012/0075799 | A1 * | 3/2012 | Pollex | G06F 1/1628 361/679.56 |
| 2014/0111912 | A1 * | 4/2014 | Gobeil | G06F 1/1632 361/679.01 |
| 2014/0168264 | A1 | 6/2014 | Harrison et al. | |
| 2017/0020454 | A1 | 1/2017 | Keteyian et al. | |
| 2017/0039881 | A1 | 2/2017 | Belch | |
| 2018/0252927 | A1 * | 9/2018 | Inoue | A61B 3/0083 |
| 2019/0116350 | A1 * | 4/2019 | Goto | A63F 13/213 |
| 2019/0217185 | A1 * | 7/2019 | Sakaguchi | A63F 13/211 |
| 2020/0197822 | A1 * | 6/2020 | Horii | A63F 13/428 |

FOREIGN PATENT DOCUMENTS

| | | |
|---|---|---|
| JP | 408196514 | 8/1996 |
| JP | 3085720 | 9/2000 |
| JP | U3085720 | 5/2002 |
| JP | 2014013397 | 1/2014 |
| JP | 2016026311 | 2/2016 |
| JP | 2017064301 | 4/2017 |
| WO | WO-2017057771 | 4/2017 |

OTHER PUBLICATIONS

Nintendo Virtual Boy Stand Photo (Year: 1995).*
Sony's 3D head-mounted display prototype face-on, Jun. 1, 2011, https://www.engadget.com/2011/01/06/sonys-3d-head-mounted-display-prototype-face-on/.
Waring, Dene "Virtual Reality for Visitor Attractions", Published Jun. 12, 2015, https://www.linkedin.com/pulse/virtual-reality-visitor-attractions-dene-waring?forceNoSplash=true.
Virtual reality and parallel systems performance analysis.

* cited by examiner

VIRTUAL REALITY HEADSET STANDS

BACKGROUND

Augmented reality/virtual reality (AR/VR), hereinafter referred to as virtual reality, continues to increase in popularity both for entertainment and commercial purposes. Virtual reality headsets are worn on a user's head and cover the user's eyes. The headsets display the virtual reality images to a user and may be transitional as the user moves his/her head.

DETAILED DESCRIPTION

The examples described herein provide a mechanism to hold a virtual reality headset to allow a graphic designer, programmer, architect, engineer, etc. to be able to view virtual reality images/videos in through the headset without having to physically put the headset on over his/her head using traditional head mounts or straps, and which allows either no-handed or one-handed holding of the mechanism. Because the virtual reality headset is held in place by an attached stand, the user's hand or hands are free to be able to continue to work on the computer's keyboard or touchscreen, and to further allow the user to easily switch views between a conventional computer screen and a virtual reality headset. The stand has a small size so as to not consume much space on the user's workstation and be easily carried by a user in a desired utilization.

FIGS. 1A through 10 are various views illustrating a virtual reality headset stand 5 and virtual reality headset 25, according to an example. The self-supporting stand 5 may sit on a user's desk, and next to the user's computer that is running the virtual reality software such that the stand 5 holds the virtual reality headset 25 in place. The user can lean into the headset 25 to view the virtual reality images/video but does not have to physically hold the stand 5 or headset 25. The virtual reality headset stand 5 comprises a base 10, a stem 15 extending from the base 10, and a docking station 20 attached to the stem 15. The stem 15 may be angled toward the base 10. The docking station 20 may be angled away from the stem 15. According to an example, the docking station 20 may be angled away from the stem 15 of the stand 5 so as to not interfere with the user's body when looking downward and without requiring that the stem 15 be removed before the virtual reality headset 25 is used. Also, the base 10 may be angled toward the stem 15 so as to counter the imbalance of the docking station 20 which is angled away from the stem 15, according to one example.

Figure 1A:
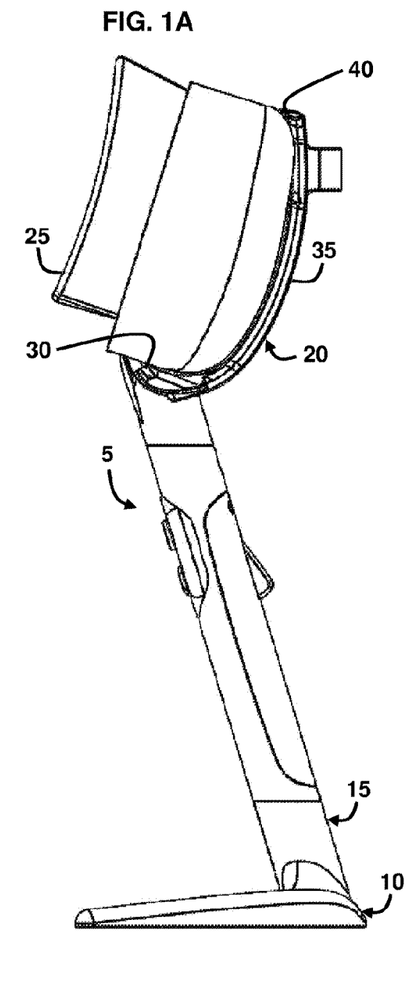
FIG. 1A is a side view illustrating a schematic diagram of a virtual reality headset stand and virtual reality headset, according to an example.
Figure 1B:
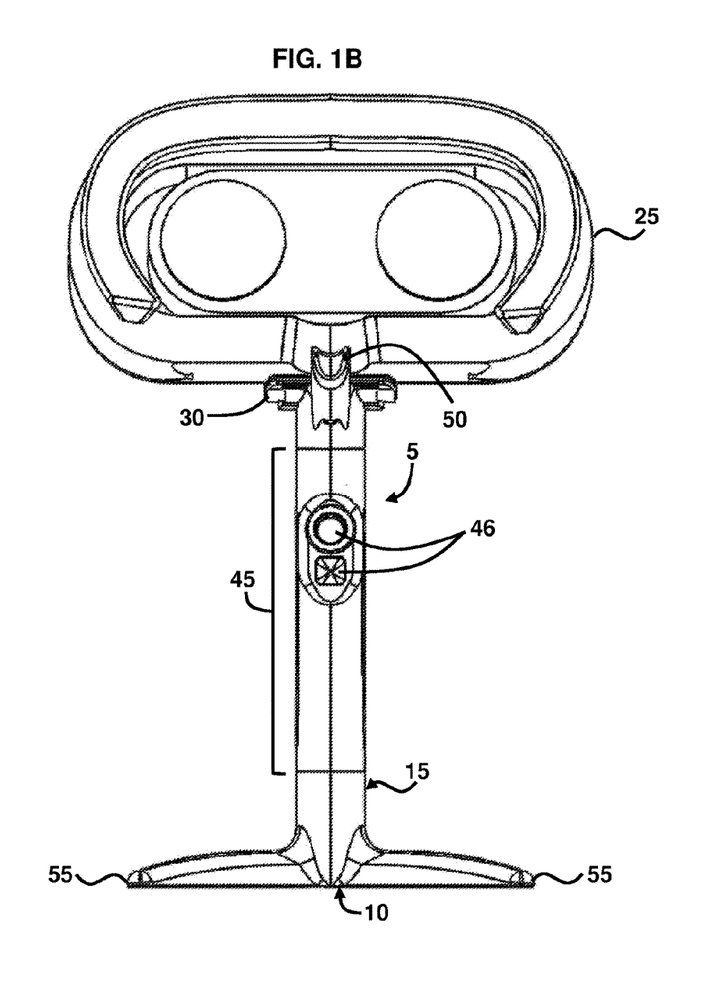
FIG. 1B is a front view illustrating a schematic diagram of a virtual reality headset stand and virtual reality headset, according to an example.
Figure 1C:
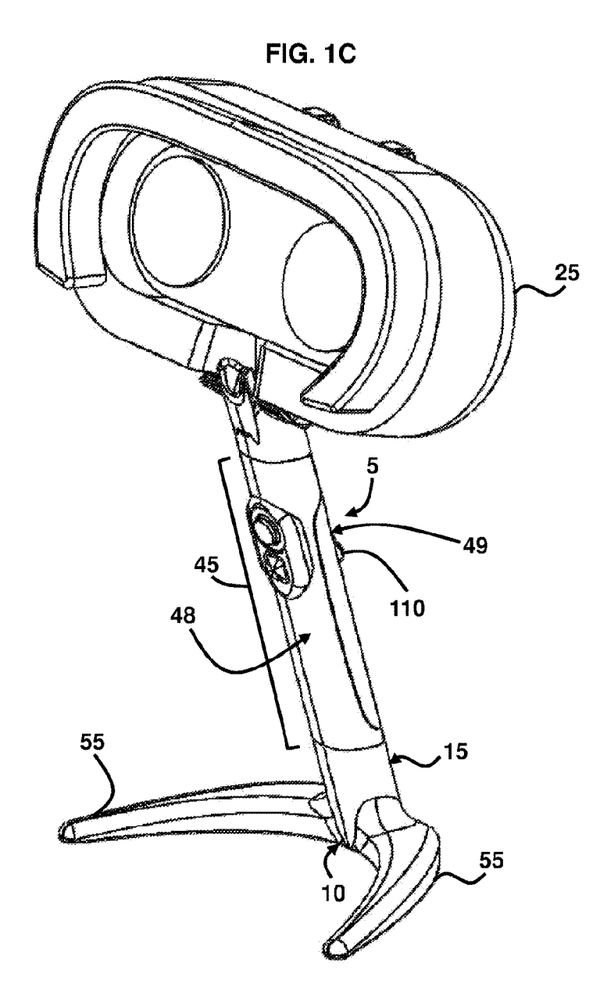
FIG. 1C is a perspective front view illustrating a schematic diagram of a virtual reality headset stand and virtual reality headset, according to an example.

The docking station 20 may be contoured to hold the virtual reality headset 25. The virtual reality headset 25 may be any type of virtual reality headset used in the industry, and while straps are typically incorporated into the virtual reality headset design, the examples herein do not require that the virtual reality headset 25 comprise head straps. However, the stand 5 operates equally with a virtual reality headset 25 containing head straps or strapless. The docking station 20 includes various attachment mechanisms including, but not limited to, a lip 30 connected to the stem 15, a body portion 35 connected to the lip 30, and a clip 40 connected to the body portion 35 and set to retain the virtual reality headset 25 in place when the stand 5 is lifted or moved with the virtual reality headset 25 attached.

In one example, the stem 15 comprises a controller mechanism 45 to control actions presented in the virtual reality headset 25. The controller mechanism 45 may comprise one or more buttons, joysticks or other input control devices 46, 110 and be electrically connected to the virtual reality headset 25 wirelessly, or by way of wires, not shown in FIGS. 1A through 10. In one example, the input control device 46 may be positioned along a first side 48 of the controller mechanism 45, while the input control device 110 is positioned along a second side 49 of the controller mechanism 45, wherein the first side 48 is oppositely positioned from the second side 49.

Figure 2A:
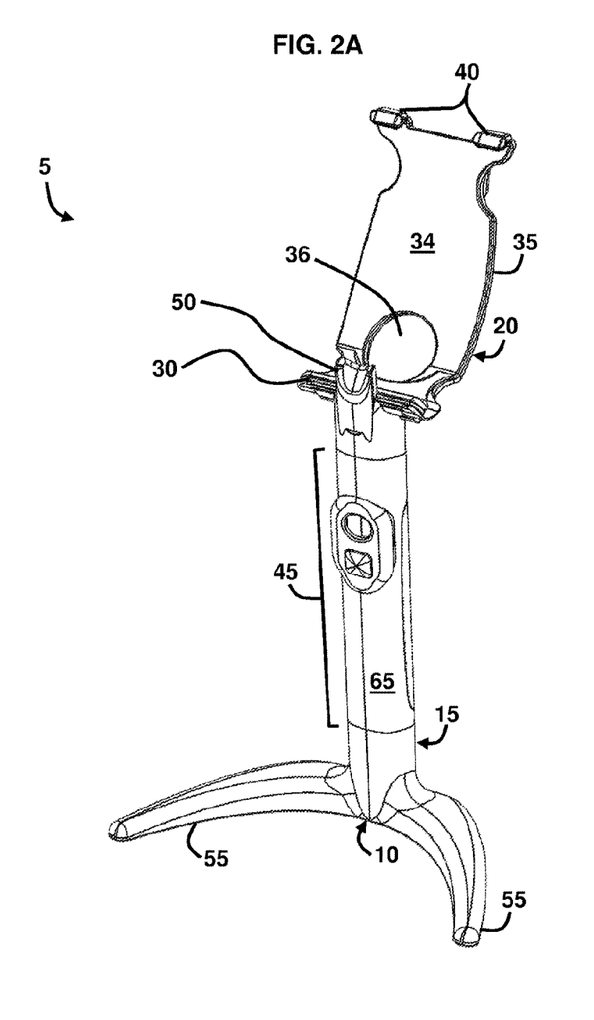
FIG. 2A is a perspective front view illustrating a schematic diagram of a virtual reality headset stand, according to an example.
Figure 2B:
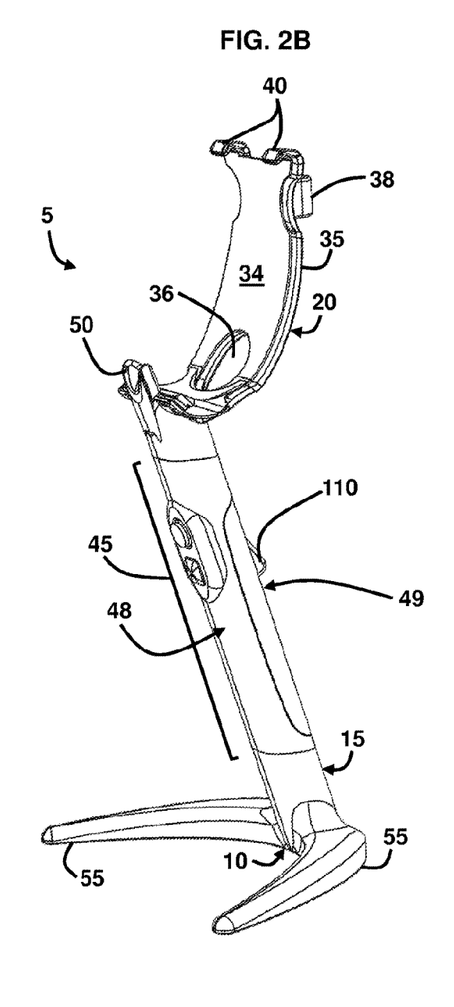
FIG. 2B is a perspective side view illustrating a schematic diagram of a virtual reality headset stand, according to an example.
Figure 2C:
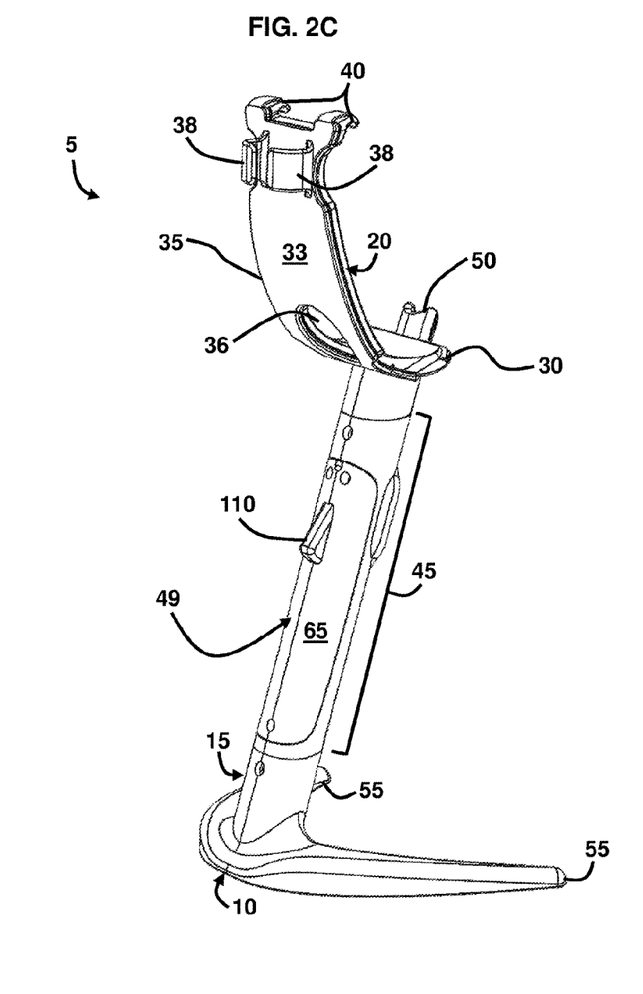
FIG. 2C is a perspective rear view illustrating a schematic diagram of a virtual reality headset stand, according to an example.

FIGS. 2A through 2C, with reference to FIGS. 1A through 10, are various views illustrating the virtual reality headset stand 5 isolated without the attached virtual reality headset 25. In an example, the stem 15 may comprise a contoured surface 65. The stem 15 may also comprise a retaining member 50 adjacent to the lip 30 of the docking station 20. In one example, and as shown in the drawings, multiple clips 40 may be provided on the docking station 20. In other examples, an elongated single clip 40 may be utilized. The body portion 35 of the docking station 20 may comprise a contoured rear surface 33 and a contoured front surface 34 to properly align with and retain the virtual reality headset 5. The body portion 15 of the docking station 20 may also incorporate holes; e.g. hole 36, to avoid covering sensors; e.g. a camera on the virtual reality headset 25. A pair of clips 38 extending from the rear surface 33 of the body portion 35 may also be provided, according to one example. In an example, the clips 38 may also be used to accommodate and maintain the wires of the virtual reality headset 5.

The base 10 is connected to the stem 15 and positioned at an opposite end from the docking station 20. The base 10 may be configured in any suitable manner to provide proper support for keeping the stand 5 upright when it is not being held by a user. In this regard, the base 10 permits the stand 5 to be free-standing to also serve as a completely hands-free stand 5 to permit a user to view the images displayed in the virtual reality headset 25 without requiring the user to pick up the stand 5 or the virtual reality headset 25. The base 10 may comprise a pair of legs 55 outwardly protruding from the stem 15, as shown in FIGS. 1A through 2C.

Figure 3:
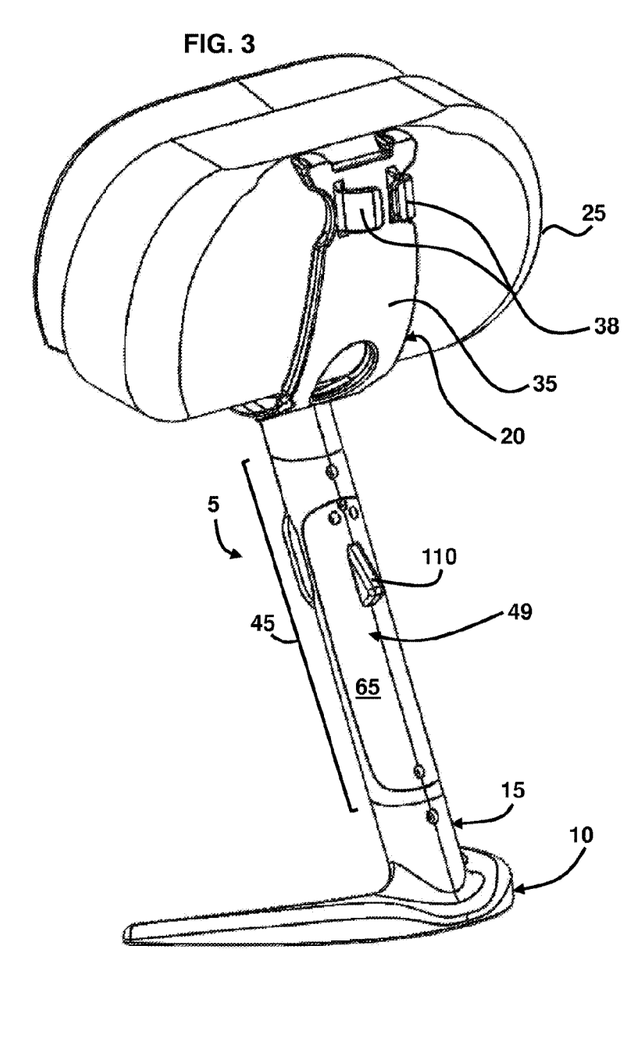
FIG. 3 is a perspective rear view illustrating a schematic diagram of a virtual reality headset stand and virtual reality headset, according to an example.

FIG. 3, with reference to FIGS. 1A through 2C, is a perspective rear view illustrating a schematic diagram of the virtual reality headset stand 5 and virtual reality headset 25, according to an example. The positioning of the input control devices 46 on the first side 48 of the controller mechanism 45, and the positioning of the input control device 110 on the second side 49 of the controller mechanism 45 allows a user to manipulate the one or more input control devices 46 using a thumb while manipulating the input control device 110 with another finger on the same hand, thereby eliminating the need to utilize two hands when operating the stand 5 or virtual reality headset 25. The input control device 110 may be configured as a push/squeeze button, in one example.

In FIGS. 1B through 3 the controller mechanism 45 is shown as a portion of the stem 15. In an alternative example, the controller mechanism 45 may be detachable from the stem 15 whilst keeping the stem 15 mechanically intact, and allowing the stand 5 to still be used to support and retain the headset 25. In another example, the stand 5 may be set to accommodate one of the handheld controllers associated with the virtual reality headset 25 itself. In this latter case, the functionality of the handheld controller may change when a virtual reality system detects that it has been attached to the stand 5. In another example, the stand 5 may include gimbals, not shown in the drawings, where the docking station 20 attaches to the stem 15, which allow some additional head movement relative to the portion of the stand 5 held by the user. Sensors may be attached to these gimbals allowing the motion of the virtual reality display 25 with respect to the rest of the stand 5 to be used as another input to the controller mechanism 45.

Figure 4:
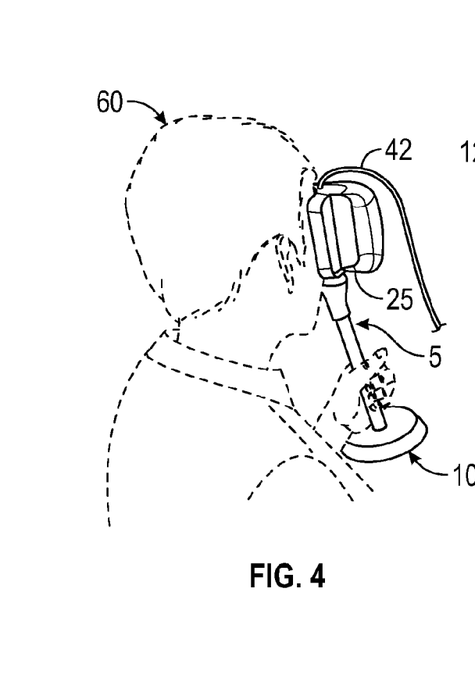
FIG. 4 illustrates a schematic diagram of a virtual reality stand and virtual reality headset in use, according to an example.

FIG. 4, with reference to FIGS. 1A through 3, illustrates a schematic diagram of a virtual reality headset stand 5 and virtual reality headset 25 in use, according to an example. In FIG. 4, the dashed lines represent the potential positioning of a user 60. In this example, the stand 5 is configured as a stick-like stand 5 that sits on a surface, such as a desk, and which can be lifted and moved by the user 60. The base 10 may be provided in any suitable configuration to provide the stand 5 with proper support to stay upright in its free-standing position; i.e. without the user 60 having to hold the stand 5 in place and upright. The user 60 may pick up the stand 5 and place the virtual reality headset 25 against his/her head. Alternatively, the user 60 may simply keep the stand 5 resting on a surface, such as a desk or computer workstation, and may position his/her head against the virtual reality headset 25 that is retained and attached to the stand 5. In one example, the base 10 and stem 15 comprise a supporting force sufficient to keep the virtual reality headset 25 in position in the docking station 20 while the virtual reality headset 25 is placed in front of the eyes of the user 60. The virtual reality headset 25 is held in position in front of the eyes of the user 60 without requiring straps to be placed over a head of the user 60, according to an example. The contoured surface 65 of the stem 15 may allow the user 60 to hold the stem 15 and move the stand 5 while the virtual reality headset 25 is placed in front of eyes of the user 60. The wires 42 of the virtual reality headset 25 are illustrated in FIG. 4, and may connect the virtual reality headset 25 to a computer, which is not shown in FIG. 4. In one example, the stand 5 also contains wires 42, which are connected to the computer. In another example, the electronics relating to the controller mechanism 45 of the stand 5 are wirelessly connected to the computer.

Figure 5A:
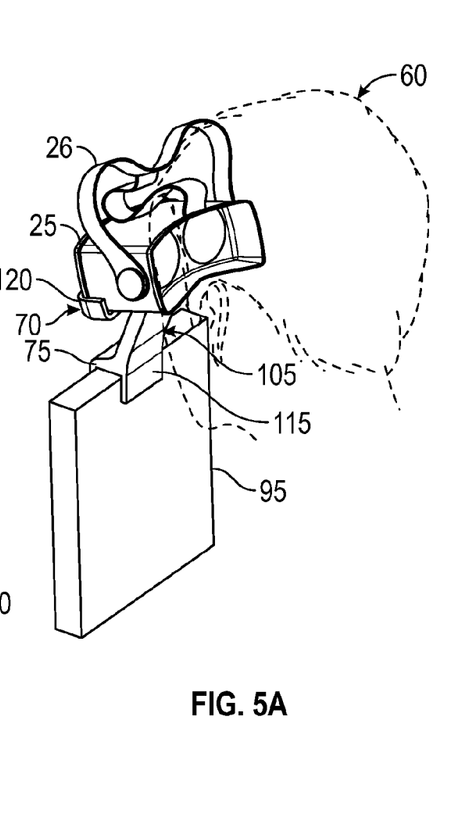
FIG. 5A is a perspective view illustrating a schematic diagram of a virtual reality headset stand connected to a body pack and a virtual reality headset, according to an example.
Figure 5B:
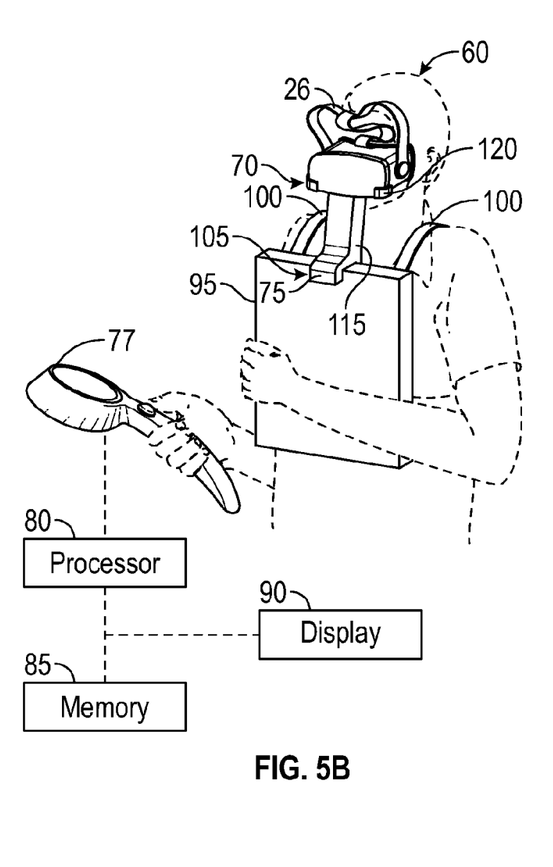
FIG. 5B illustrates a schematic diagram of a system, according to an example.

FIG. 5A, with reference to FIGS. 1A through 4, is a perspective view illustrating a schematic diagram of another example of the virtual reality headset stand 105 that connects to a body pack 95 and a virtual reality headset 25, according to an example. The body pack 95 may contain a portable version of a computer used to run a virtual reality system 70. The system 70 may be set for use as a backpack, but, with at least one user attachment mechanism 100, as shown in FIG. 5B, the system 70 may be held against the front of the body of a user 60 for short duration use. The stand 105 is set to hold the virtual reality headset 25 in such a way that the user 60 may comfortably press their face against the virtual reality headset 25 when the body pack 95 is being held against the front of the body of the user 60. The stand 105 may incorporate various adjustment mechanisms (not shown) that allow the height etc. of the virtual reality headset 25 to be adjusted as required by the user 60. In FIG. 5A, the dashed lines represent the potential positioning of the head of a user 60. While straps 26 are shown connected to the virtual reality headset 25 in FIG. 5A, the examples described herein do not require that the user 60 place the straps 26 over his/her head for proper retention of the virtual reality headset 25 against the head of the user 60. The stand 105 includes a docking station 120 to retain the virtual reality headset 25. The stand 105 also includes a stem 115 and a connection member 75 that attaches to the body pack 95.

FIG. 5B, with respect to FIGS. 1A through 5A, illustrates the virtual reality system 70 comprising the stand 105 comprising the connection member 75, a stem 115 extending from the connection member 75, and the docking station 120 attached to the stem 115, wherein the docking station 120 is contoured to hold a virtual reality headset 25. The stand 105 is mounted onto the body pack 95 that the user 60 wears by way of at least one user attachment mechanism 100. FIG. 5B illustrates a pair of user attachment mechanisms 100, according to one example. The stand 105 is held in place by the body pack 95 so that the user is not required to wear a head strap 26, but may do so if desired. Since the virtual reality headset 25 is attached to the body pack 95 and the body pack 95 is held in place when worn by the user 60, the user 60 is not required to directly hold the virtual reality headset 25 and may simply press his/her head against the virtual reality headset 25. This example permits the user 60 to stand up, turn around, and move about a room while viewing the images/video through the virtual reality headset 25. The body pack 95 may also comprise a desktop dock, not shown, that holds the body pack 95 upright in such a way that the user 60 can simply press their face against the virtual reality headset 25 when the body pack 95 is not being worn and is docked on a desktop.

In FIG. 5B, the dashed lines in the shape of a user 60 represent the potential positioning of the user 60. FIG. 5B shows the user 60 using a handheld control device 77. The handheld control device 77 may be used to control actions presented in the virtual reality headset 25. The handheld control device 77 may be wirelessly connected to the virtual reality headset 25. In one example, a controller mechanism, similar to controller mechanism 45 in FIGS. 1B through 3, may be provided on the body pack 95 or on the stand 105 placed for easy access by the hand of the arm of the user 60 being used to grip the body pack 95. In another example, the stand 115 may comprise gimbals, not shown in the drawings, which allows some additional head movement. Sensors may be attached to these gimbals allowing the motion of the virtual reality display with respect to the body pack to be used as another input to the controller mechanism 45.

A processor 80 is communicatively linked to the control device 77, and to the controller mechanism 45, if present. For example, the control device 77 may be communicatively linked by a wireless connection, in one example, or a wired connection in another example. A memory 85 is provided comprising instructions executable by the processor 80 to perform method 200 described in FIG. 6. A display device 90 is communicatively linked to the processor 80 to display the computer-simulated images and the converted computer-simulated images generated by method 200.

Figure 6:
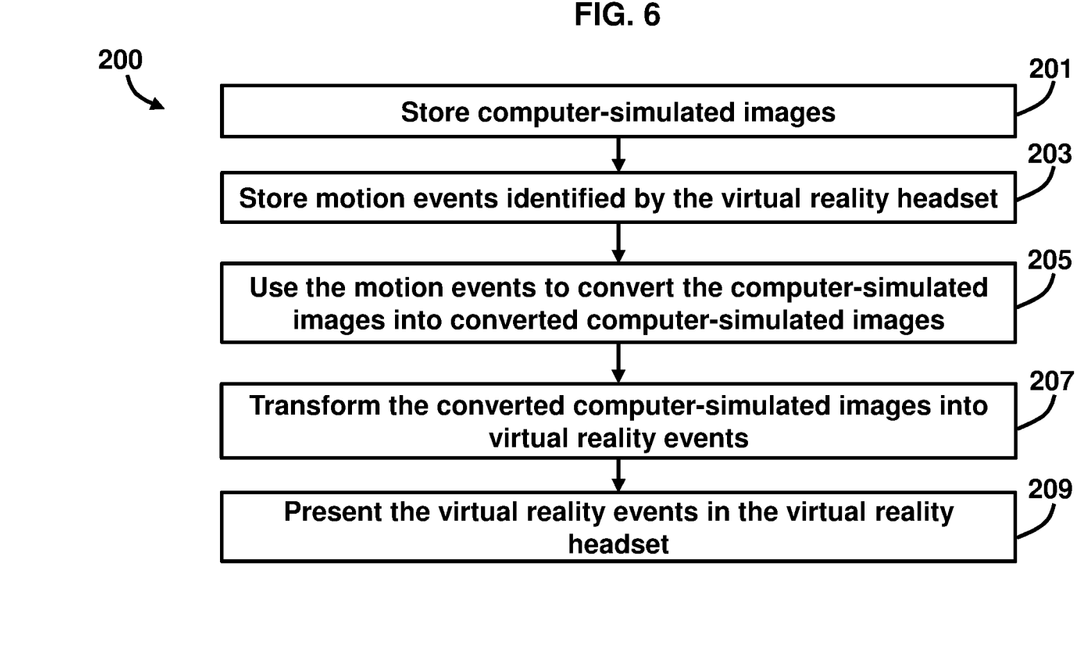
FIG. 6 is a flowchart illustrating a method, according to an example.

In method 200 shown in FIG. 6, with reference to FIGS. 1A through 5B, block 201 is provided to store computer-simulated images. Block 203 is provided to store motion events identified by the virtual reality headset 25. Block 205 is provided to use the motion events to convert the computer-simulated images into converted computer-simulated images. Block 207 is provided to transform the converted computer-simulated images into virtual reality events. Block 209 is provided to present the virtual reality events in the virtual reality headset 25.

In one example, the instructions cause the processor 80 to edit the virtual reality events presented in the virtual reality headset 25. In another example, the control device 77 is set to edit the virtual reality events presented in the virtual reality headset 25.

Figure 7:
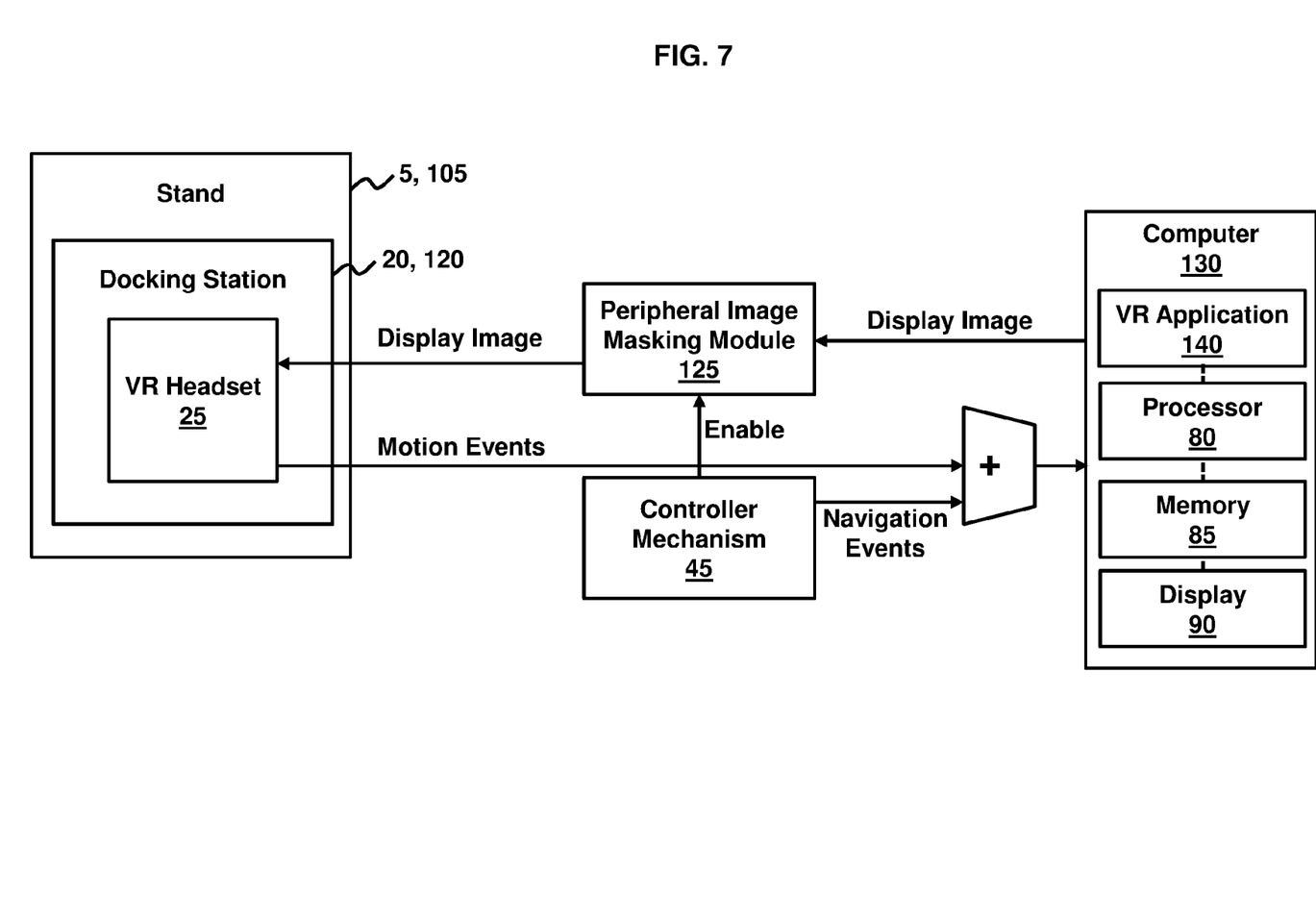
FIG. 7 illustrates a system block diagram, according to an example.

FIG. 7, with reference to FIGS. 1A through 6, illustrates a block diagram of a system 70, according to an example. The system 70 comprises stand 5, 105 comprising the docking station 20, 120, respectively, to hold the virtual reality headset 25. The system 70 also includes the controller mechanism 45, which in this example is used to control navigation in the virtual reality application. For example, the controller mechanism 45 is set to navigate motion events within a virtual reality space presented in the virtual reality headset 25. In one example, A computer 130 is communicatively linkable to the controller mechanism 45 and virtual reality headset 25, wherein the computer 130 comprises the processor 80, and the memory 85 comprising instructions executable by the processor 80 to perform method 250 shown in FIG. 8.

Figure 8:
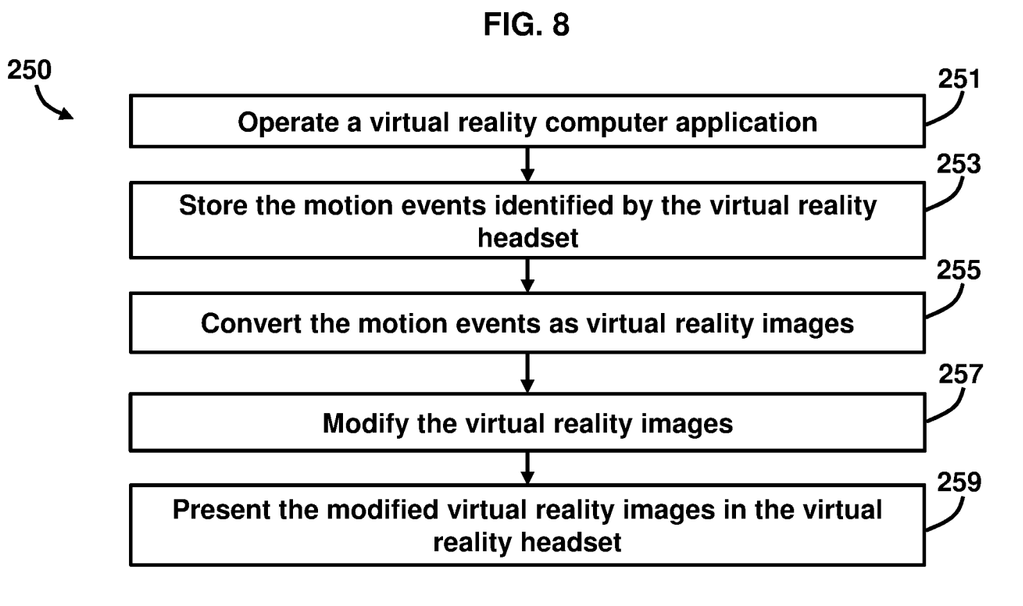
FIG. 8 is a flowchart illustrating another method, according to an example.

In method 250 shown in FIG. 8, with reference to FIGS. 1A through 7, block 251 is provided to operate a virtual reality computer application 140. Block 253 is provided to store the motion events identified by the virtual reality headset 25. Block 255 is provided to convert the motion events as virtual reality images. Block 257 is provided to modify the virtual reality images. Block 259 is provided to present the modified virtual reality images in the virtual reality headset 25.

Once again with reference to FIG. 7, a virtual reality headset 25 is attached to a stand 5, 105, which stands on its own or otherwise does not require a user 60 to physically hold the stand 5, 105. As an example, when the user 60 starts modeling objects using three-dimensional (3D) computer-aided design (CAD) software on a display screen 90 of a computer 130, a plugin utility takes in the in-progress CAD data and automatically converts it into a virtual reality-viewable 3D data. The user 60 is able to see the in-progress design in the virtual reality environment, by viewing the images through the virtual reality headset 25. The CAD operator, which may or may not be the user 60, may make adjustments using the computer 130 and visually depicted on display 90, and the adjusted images are automatically updated on the virtual reality model presented in the virtual reality headset 25. In one example, the controller mechanism 45 is displayed in the modified virtual reality images in the virtual reality headset 25.

Typically, use of virtual reality systems at a desktop location may place restrictions on the freedom of physical motion the user 60 can employ when in virtual reality. In addition to the space requirements, there may be limitations on the cable length and available optical tracking infrastructures may not work well in a large open office environment with multiple users.

In the case where no tracking infrastructure is available, some limited headset motions could be detected by sensors in the stand 5, 105. For example, rotation sensors on gimbals connecting the display docking station 20,120 to the stem 15, 115, or an inertial measurement unit in the docking station 20, 120. Also, orientation information can typically be obtained from the sensors, such as magnetometers and accelerometers, included in the virtual reality headset 25. Rotation encoders at each rotation point may be used to augment this information.

For movements beyond this, the controller mechanism 45 may be used. For example, the controller mechanism 45 may be set to provide at least five degree of freedom with translation in the three spatial dimensions, plus view pitch (/elevation) and yaw (/azimuth). This may be achieved through some combination of joysticks, trackballs, directional pads, thumbwheels etc. at the positions of the input control devices 46, 110 in FIGS. 1B through 3. Another manner for translation in virtual reality is "teleporting"; i.e., pointing to a location and activating some control that causes the user's viewpoint to move to that location. A control dedicated to this operation may be included in the controller mechanism 45.

Figure 9A:
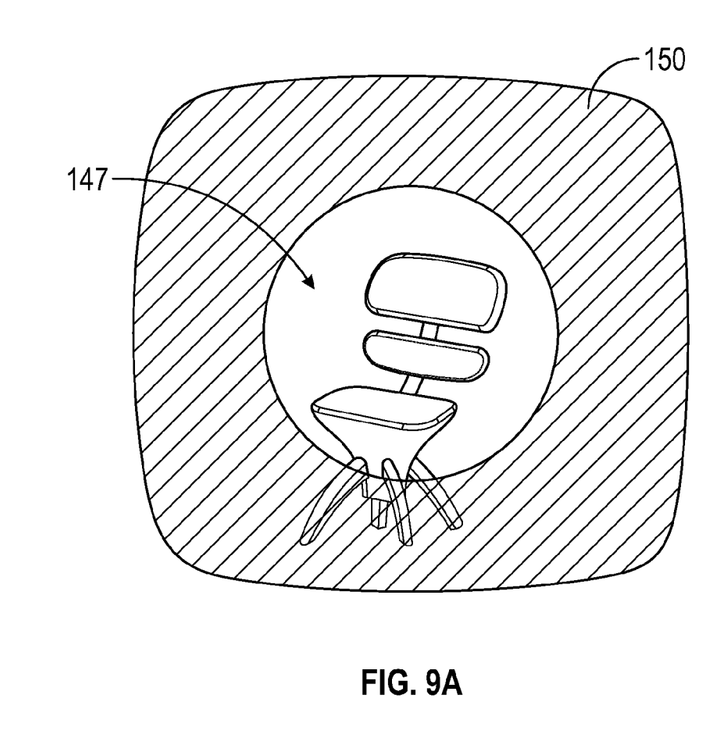
FIG. 9A illustrates a schematic diagram of a first virtual reality image, according to an example.
Figure 9B:
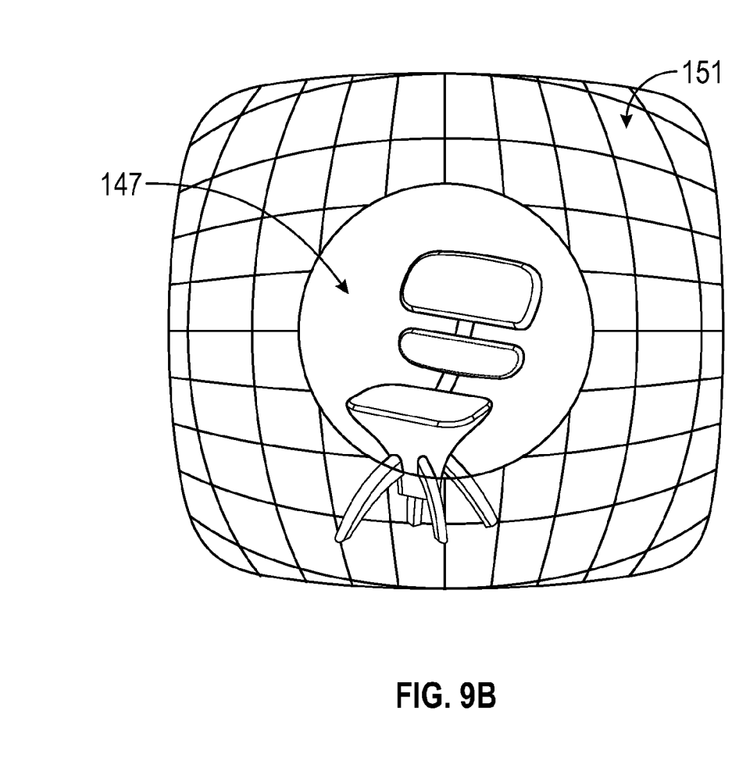
FIG. 9B illustrates a schematic diagram of a second virtual reality image, according to an example.

FIGS. 9A and 9B, with reference to FIGS. 1A through 8, illustrate schematic diagrams of virtual reality images 147, according to various examples. Typically, any movement in virtual reality that is not caused by the motion of the user's head in space is likely to cause virtual reality sickness, which may be countered by removing peripheral visual cues during such movement. Thus, the controller mechanism 45 may include sensors to indicate when the control is touched. As soon as this happens the view seen by the user 60 in the virtual reality headset 25 is changed so as to obscure or suppress motion in the peripheral field of view 150. The modified virtual reality images that are presented to the virtual reality headset 25, as depicted in FIG. 7 and also described in block 259 of FIG. 8, may comprise virtual reality images 147 with peripheral visual motion cues removed or masked 150 from the virtual reality images 147.

A masking software module 125, as shown in FIG. 7, may be used in conjunction with the computer 130 to remove the peripheral visual motion cues 150 of FIGS. 9A and 9B. In FIG. 9A, the view is irised down to eliminate the view of peripheral features 150. In FIG. 9B, a high contrast static chaperone-like grid 151 is superimposed on the peripheral imagery 150, with has the effect of suppressing the motion cues due to the motion of the lower contrast imagery behind the grid 151.

Figure 10A:
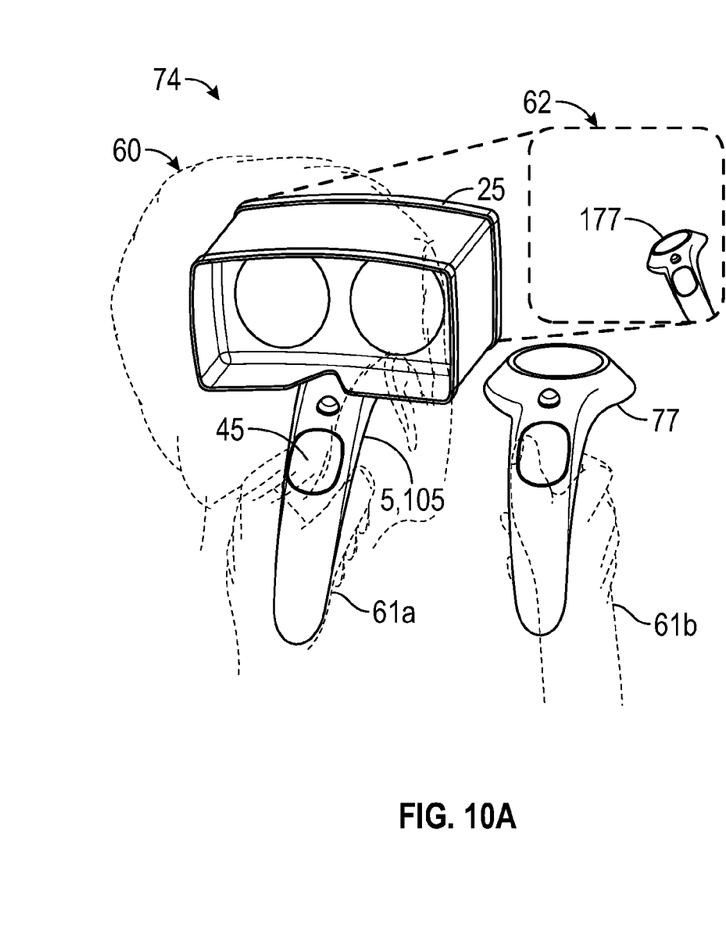
FIG. 10A illustrates a schematic diagram of a virtual reality headset and controller, according to an example.
Figure 10B:
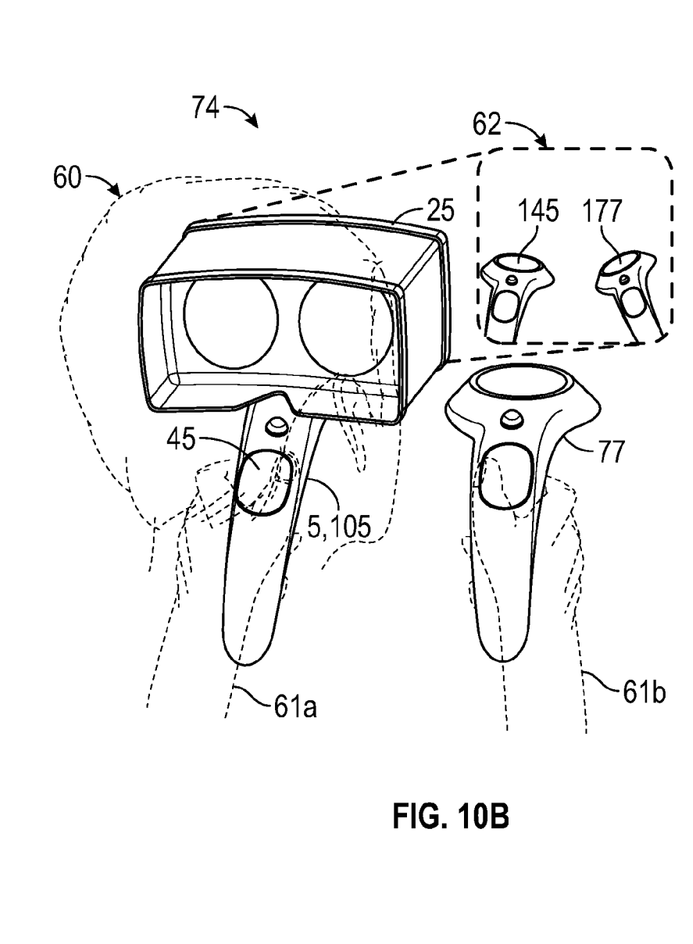
FIG. 10B illustrates a schematic diagram of a virtual reality headset and controller, according to another example.

FIGS. 10A and 10B, with reference to FIGS. 1A through 9B, illustrate schematic diagrams of a virtual reality headset 25 and associated virtual reality system handheld controller 77, according to various examples. Some virtual reality applications benefit from input from two handheld controllers, one held in each hand of a user. For example, the controller in the non-dominant hand may be triggered to display a menu palette from which the user may make selections with the controller in the dominant hand. Typically, avatars representing both controllers are generated by the virtual reality system at virtual locations corresponding to their physical locations in the user's hands as a useful reference for the user. In FIGS. 10A and 10B, the dashed lines in the shape of a user 60 represent the potential positioning of the user 60.

As shown in FIGS. 10A and 10B, in the case where the non-dominant hand 61a is being used to hold the virtual reality headset stand 5,105, the controller mechanism 45 in the stand 5, 105 may be set to mimic the controls used on the non-dominant hand's virtual reality system controller. The virtual reality system 74 may generate an avatar 177 corresponding to the handheld controller 77 being held by the dominant hand 61b of the user 60 and displayed in a corresponding location in the virtual scene 62. When used as a second instance of handheld controller 77, the system 74 may display the avatar 145 for the non-dominant handheld controller that controller mechanism 45 is mimicking. As the controller mechanism 45 may be attached to the stand 5, 105 holding the virtual reality headset 25, its location will typically be outside of the user's virtual field of view 62. To provide a useful reference to the user 60, the avatar 145 may be displayed in a fixed location within the virtual view 62, for example, as shown in FIG. 10B, in a position equivalent to where it would normally be held at arm's length in front of the user 60. Display of the controller avatar 145 may also be controlled by a dedicated switch; e.g., input control devices 46, 110 on the controller mechanism 45. The avatar's position would be fixed with respect to the virtual reality headset 25, but many control functions would still be possible.

Various examples described herein may include both hardware and software elements. The examples that are implemented in software, for example the methods 200, 250 of FIGS. 6 and 8, include but are not limited to, firmware, resident software, microcode, etc. Other examples may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device containing software code.

Figure 11:
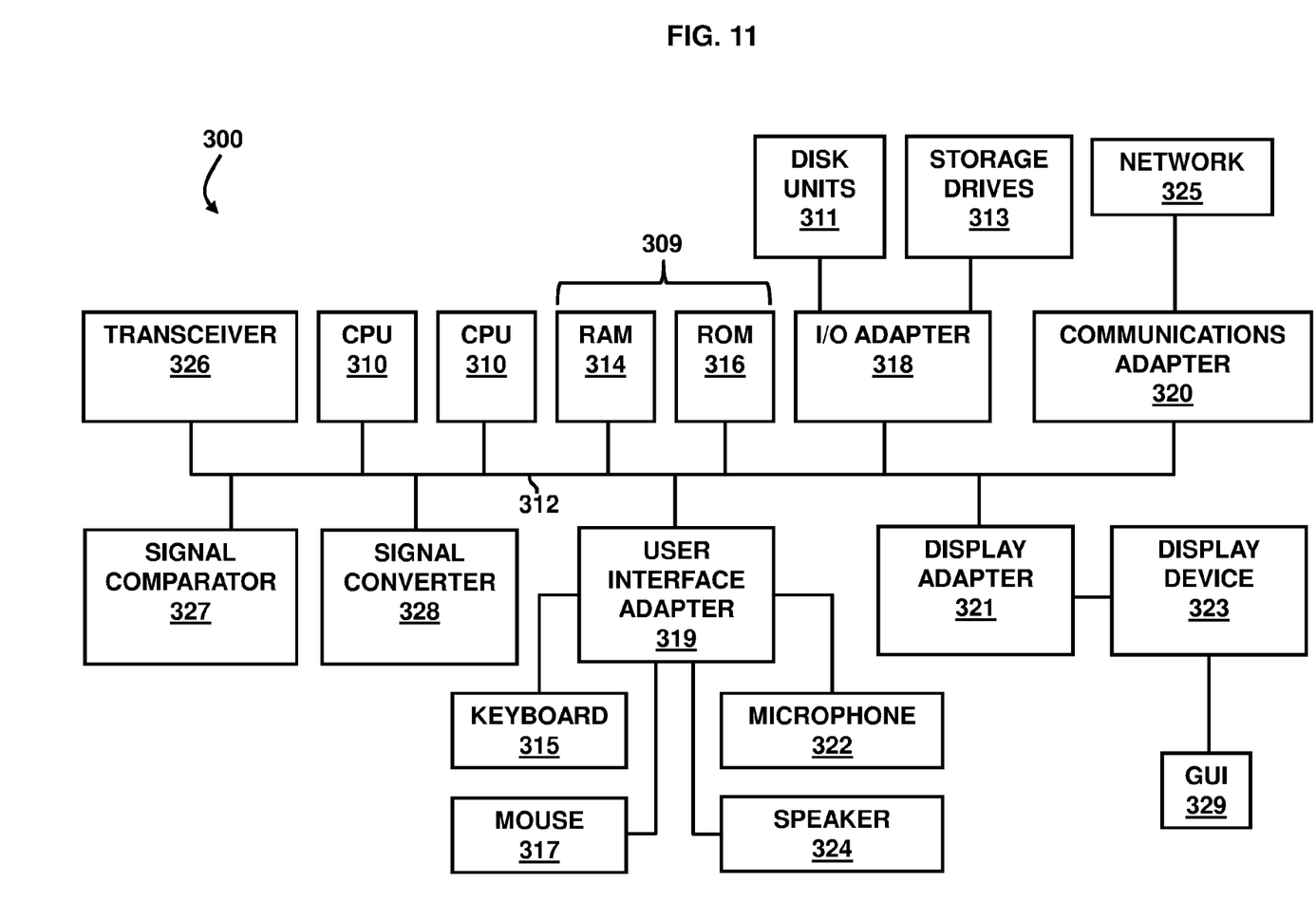
FIG. 11 is a computer system diagram, according to an example.

A representative hardware environment for practicing the software examples herein is depicted in FIG. 11, with reference to FIGS. 1A through 10B. This block diagram illustrates a hardware configuration of an information handling/computer system 300 according to an example herein. The system 300 comprises one or more processors or central processing units (CPU) 310, which may communicate with processor 80. The CPUs 310 are interconnected via system bus 312 to at least one memory device 309 such as a RAM 314 and a ROM 316. In one example, the at least one memory device 309 may be configured as the memory 85. The at least one memory device 309 may include local memory employed during actual execution of the program code, bulk storage, and cache memories which provide temporary storage of at least some program code in order to reduce the number of times code must be retrieved from bulk storage during execution.

An I/O adapter 318 may connect to peripheral devices, such as disk units 311 and storage drives 313, or other program storage devices that are readable by the system 300. The system 300 includes a user interface adapter 319 that may connect the bus 312 to a keyboard 315, mouse 317, speaker 324, microphone 322, and/or other user interface devices such as a touch screen device to gather user input and display information from/to a user 60. Additionally, a communication adapter 320 connects the bus 312 to a data processing network 325, and a display adapter 321 connects the bus 312 to a display device 323, which may be configured as display device 90, and which may provide a graphical user interface (GUI) 329 for a user 60 to interact with. Further, a transceiver 326, a signal comparator 327, and a signal converter 328 may be connected to the bus 312 for processing, transmission, receipt, comparison, and conversion of electric or electronic signals, respectively.

While a large portion of virtual reality consumption may take place in dedicated spaces, creating the workflow content for virtual reality may remain a desktop activity very much for the foreseeable future. The workflows of graphic design users and other content creators may be significant enhanced by allowing them to quickly review their work in virtual reality without leaving their desks and workstations. The stand 5, 105 may permit a user 60 to bring 3D contents from the display device 90 to review in virtual reality through the virtual reality headset 25 in a seamless manner. The controller mechanism 45 and controller 77 may permit the user 60 to simultaneously view the images in virtual reality and modify the original file on CAD software running on the computer 130. For example, the virtual reality headset stand 5 may incorporate joystick-like controls using the controller mechanism 45 to manipulate the virtual reality model views, or may utilize haptic feedback to indicate limits and snaps of the 3D model.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A virtual reality headset stand comprising:
   a base;
   a stem extending from the base, wherein the stem is angled toward the base; and
   a docking station attached to the stem, wherein the docking station is angled away from the stem, wherein the docking station is contoured to hold a virtual reality headset, and wherein the docking station comprises:
   a lip connected to the stem;
   a body portion connected to the lip; and
   a clip connected to the body portion;

wherein the stem comprises:
  a contoured surface; and
  a controller mechanism to control actions presented in the virtual reality headset, the controller mechanism comprising of input control devices positioned along opposite sides of the controller mechanism and on the contoured surface;
wherein the contoured surface allows a user to hold the stem, move the stand while the virtual reality headset is placed in front of eyes of the user, and interact with the input control devices; and
wherein the virtual reality headset displays an avatar of the controller mechanism at a fixed position, and the avatar is controlled by the input control devices.

2. The stand of claim 1, wherein the stem comprises a retaining member adjacent to the lip of the docking station.

3. The stand of claim 1, wherein the base comprises a pair of legs outwardly protruding from the stem.

4. The stand of claim 1, wherein the base and stem comprise a supporting force sufficient to keep the virtual reality headset in position in the docking station while the virtual reality headset is placed in front of the eyes of a user.

5. The stand of claim 4, wherein the virtual reality headset is held in position in front of the eyes of the user without requiring straps to be placed over a head of the user.

6. A virtual reality system comprising:
  a stand comprising:
    a connection member;
    a stem extending from the connection member; and
    a docking station attached to the stem, wherein the docking station is contoured to hold a virtual reality headset;
  a control device set to control actions presented in the virtual reality headset;
  a processor communicatively linked to the control device;
  a memory comprising instructions executable by the processor to:
    store computer-simulated images;
    store motion events identified by the virtual reality headset;
    use the motion events to convert the computer-simulated images into converted computer-simulated images;
    transform the converted computer-simulated images into virtual reality events; and
    present the virtual reality events in the virtual reality headset; and
  a display device communicatively linked to the processor to display the computer-simulated images and the converted computer-simulated images;
wherein the stem comprises:
  a contoured surface; and
  a controller mechanism to control actions presented in the virtual reality headset, the controller mechanism comprising of input control devices positioned along opposite sides of the controller mechanism and on the contoured surface;
wherein the contoured surface allows a user to hold the stem, move the stand while the virtual reality headset is placed in front of eyes of the user, and interact with the input control devices; and
wherein the virtual reality headset displays an avatar of the controller mechanism at a fixed position, and the avatar is controlled by the input control devices.

7. The virtual reality system of claim 6, wherein the instructions cause the processor to edit the virtual reality events presented in the virtual reality headset.

8. The virtual reality system of claim 6, wherein the control device is set to edit the virtual reality events presented in the virtual reality headset.

9. The virtual reality system of claim 6, wherein the control device is visually displayed in the virtual reality events presented in the virtual reality headset.

10. The virtual reality system of claim 6, comprising: a body pack connected to the connection member; and at least one user attachment mechanism connected to the body pack.

11. A system comprising:
  a stand comprising:
    a base;
    a stem extending from the base, wherein the stem is angled toward the base; and
    a docking station to hold a virtual reality headset;
  a controller mechanism to communicatively link to the virtual reality headset, wherein the controller mechanism is set to navigate motion events within a virtual reality space presented in the virtual reality headset; and
  a computer communicatively linkable to the controller mechanism and virtual reality headset, wherein the computer comprises:
    a processor; and
    a memory comprising instructions executable by the processor to:
      operate a virtual reality computer application;
      store the motion events identified by the virtual reality headset;
      convert the motion events as virtual reality images;
      modify the virtual reality images; and
      present the modified virtual reality images in the virtual reality headset;
wherein the stem comprises:
  a contoured surface; and
  a controller mechanism to control actions presented in the virtual reality headset, the controller mechanism comprising of input control devices positioned along opposite sides of the controller mechanism and on the contoured surface;
wherein the contoured surface allows a user to hold the stem, move the stand while the virtual reality headset is placed in front of eyes of the user, and interact with the input control devices; and
wherein the virtual reality headset displays an avatar of the controller mechanism at a fixed position, and the avatar is controlled by the input control devices.

12. The system of claim 11, wherein the modified virtual reality images comprise the virtual reality images with peripheral visual motion cues removed or masked from the virtual reality images.

13. The system of claim 11, wherein the controller mechanism is displayed in the modified virtual reality images in the virtual reality headset.

* * * * *